July 20, 1965 M. DANILOFF 3,195,811

DAMPING STABILIZER DEVICES

Filed June 1, 1962 2 Sheets-Sheet 1

INVENTOR
MICHAEL DANILOFF
BY Herbert W. Arnold
ATTORNEY

July 20, 1965 M. DANILOFF 3,195,811
DAMPING STABILIZER DEVICES
Filed June 1, 1962 2 Sheets-Sheet 2

INVENTOR
MICHAEL DANILOFF
BY Herbert W. Arnold
ATTORNEY

United States Patent Office 3,195,811

Patented July 20, 1965

3,195,811

DAMPING STABILIZER DEVICES

Michael Daniloff, Cambridge, Mass., assignor to Raytheon Company, Waltham, Mass., a corporation of Delaware Filed June 1, 1962, Ser. No. 199,501
10 Claims. (Cl. 235—61)

This invention relates to damping devices, and, more particularly, to means for damping the elastic computing element of a computer to prevent instability of said elastic element.

Analog computers of the elastica class are used to solve a plurality of analytical problems by means of constraining the angle of axial orientation and the position of the extremities of an elastic medium, strip or elastica, in response to input signals which locate said extremities both in position and angle of orientation, the output of said computing element being determined by the motion of a selected point on the elastic medium. During the process of calculation of said computer, the elastic medium under particular conditions frequently assumes unstable or bi-stable configurations which cause the output signal to change abruptly from one value to another differing from the first by a finite amount. For example, when the elastic medium or element is in the form of an elastic strip and the strip under certain conditions of the problem being solved assumes the shape resembling the letter S, the tangents to the elastic strip at its extremities become parallel to each other. The elastic configuration under such conditions becomes unstable and the elastic strip may suddenly and abruptly pass from the unstable configuration resembling the letter S to the stable configuration resembling the letter C. This phenomenon has been called "flop-over." As a result, an output signal taken from any point on the elastica will jump discontinuously from one value to another value distinct from the first, thus giving an undesirable multivalued answer. It is, therefore, an object of the present invention to apply damping means to the elastic medium or strip, so as to prevent instability under any combination of input signals.

Thus, an elastica computer, when adequately stabilized by the present invention, can be used for the solution of any problem of which the elastica is an analog model, specifically, for the solution of a problem governed by a differential equation of the same form as the differential equation of the elastica. An example of the application of an elastica computer to the solution of a navigation problem is disclosed in United States Letters Patent No. 2,983,441 of H. J. Galbraith, issued May 9, 1961, on an application filed December 20, 1957. Thus, a typical and important problem which requires the use of a stabilized elastica computer is called for in an airborne computer which is used to direct an object, such as an aircraft, from any given point in space to a given point of destination in a given time and direct said object to travel over said point in a given direction. In such a problem, "flop-over" or instability of the elastic medium results in a sudden and unpredictable change of the ordered direction of flight. It is, therefore, essential to avoid this instability by making the elastica stable in all its configurations in situations in which a sudden and unpredictable change of the direction of flight or in the direction of motion is particularly objectionable. Such a situation, for example arises in conjunction with computers equipped with rotating shafts controlled by an elastica as used in computers for such applications as the programming of airline traffic, the conducting of airport landing operations, or other situations in which a sudden and unpredictable change of the direction of flight cannot be tolerated.

In accordance with the present invention, stability of an elastic or flexible medium or element is achieved by the introduction of frictional damping forces or torque couples to the elastic medium or element. This is achieved by providing an elastic computing element or elastic medium in the form of a strip comprising a plurality of superimposed alternate layers of elastic material and damping material, such as, for example, a strip of an elastic material, such as Celluloid, steel, beryllium, copper, or bronze and superimposing on either side thereof a strip of damping material, such as plastic, nylon, or any form of material such as leather, fabric, or substance akin to brake-lining material. The strips of alternate elastic and damping material are preferably held in intimate contact by clamping devices spaced along the strips at distances short enough to avoid bulging of the material between said clamping devices. Since the frictional forces between the damping strips and elastic element depend upon the deformation or bending of the elastic element, this type of damping is responsive to the magnitude of the deformation or bending, that is, to relative translatory motion between the damping strips and elastic element.

The invention further discloses an additional or alternate means of preventing instability of the computing element by the introduction of damping torques to one of the extremities of said element. The damping torque produced by the damper is made responsive to the angular acceleration of one end of the elastic or resilient strip and introduces increased damping whenever a shaft connected to the extremity of the elastic strip is subject to the rapid acceleration of deceleration which occurs at the beginning and termination of the process of "flop-over." Such a damping device can be applied to either the laminated, and thus damped, elastica previously described, or to an elastica comprising a single strip and thus otherwise undamped. In its broader aspect, the damper can be utilized in any application where it is required to apply variable damping to a rotating shaft.

In this embodiment of the invention, the damping device comprises a shaft having a damping disc connected thereto and rotatable therewith. The disc is immersed in a damping liquid contained in a concentrically mounted and externally supported damper capsule which contains a viscous damping fluid which exerts a damping torque opposing the rotation of the disc. One of the circular faces of the container is made more flexible than the remainder of the container. This face can be made to move axially so as to decrease the axial clearance between that face and the adjacent surface of the damping disc. When this distance is decreased in response to a damping signal, the velocity gradient of the fluid between the damping disc and that face of the container is increased, thus increasing the tangential shearing force in the fluid resulting in an increased damping torque. The axial motion of the movable face of the container is controlled by a sleeve concentric with the shaft, the axial motion of which is governed by relative rotation response to the angular acceleration of an inertial element or flywheel mounted on the shaft in a manner to be described later.

Other and further objects and advantages of this invention will be apparent as the description thereof progresses, reference being had to the accompanying drawings, wherein.

Figure 1:
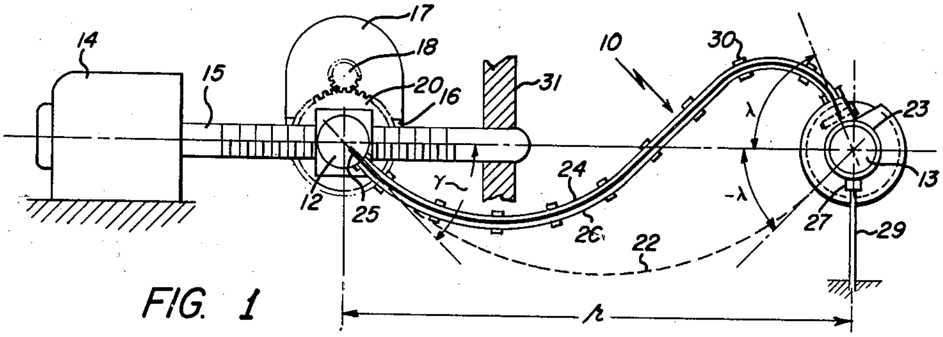
FIG. 1 is a schematic view of an elastica damped in accordance with one embodiment of the invention.
Figures 2, 3, 3A:
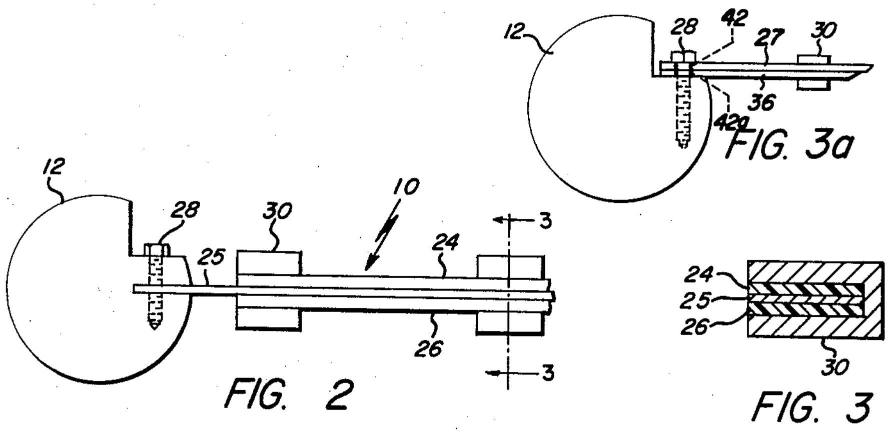
FIG. 2 is an enalrged view of the damped elastica and connection to support members, as shown in FIG. 1.
FIG. 3 is an elevation view of one type of clamp used to hold the damping strips in contact with the elastic strip of FIG. 1.
Figure 5:
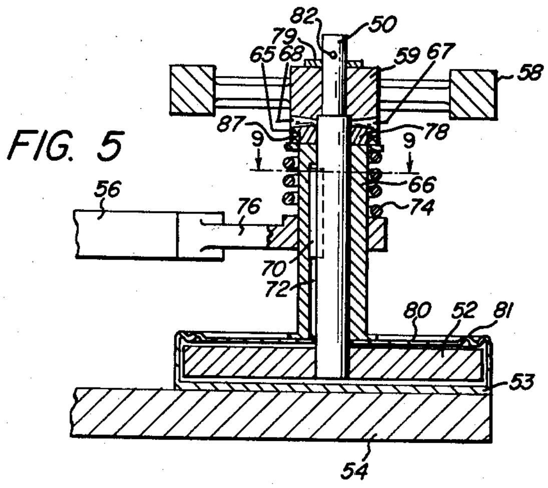
Figure 4:
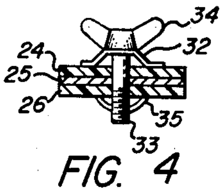
Figure 6:
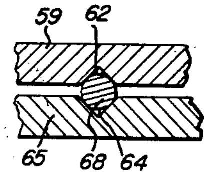
Figure 9:
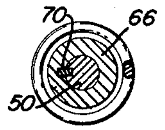
Figure 7:
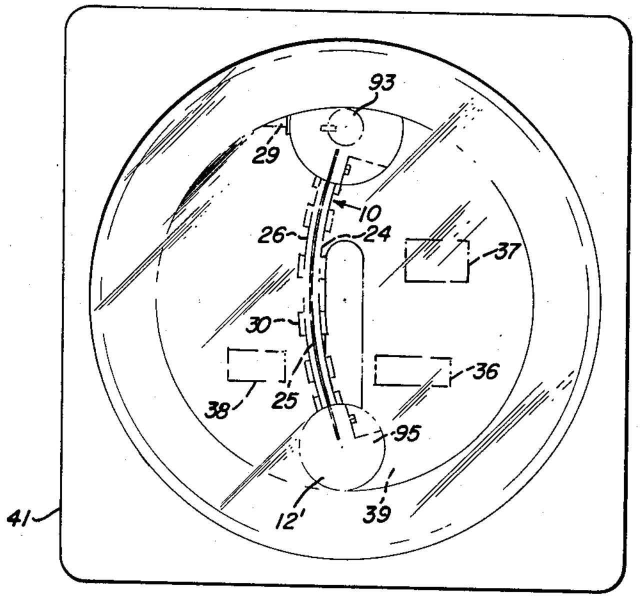
Figure 8:
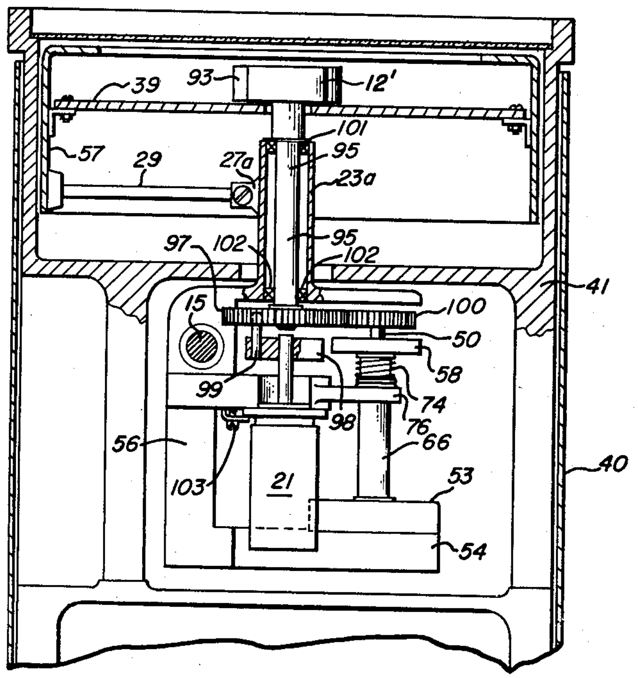

FIG. 3$a$ is an enlarged view of a further embodiment of the invention;

FIG. 4 is an elevation view of an adjustable clamp which can be used in place of the clamp shown in FIG. 3;

FIG. 5 is a sectional view of a further embodiment of the present invention;

FIG. 6 is an enlarged view of the actuating rollers shown in FIG. 5;

FIG. 6$a$ is a view showing conical grooves for driving the flywheel of FIG. 5;

FIG. 7 is a plan view of a damped elastica as used in a navigation device in the instrument panel of an aircraft;

FIG. 8 is an elevational view, sectional in part, of the mounting frame and associated parts for connecting the variable damper embodiment shown in FIG. 5 to an elastica, such as shown in FIG. 1; and FIG. 9 is a sectional view taken along the line 9—9 of FIG. 5.

Referring to the drawing, and particularly to FIG. 1, there is shown an elastic strip or elastica 10 damped in accordance with this embodiment of the invention, having one end thereof connected to an input shaft 12, and the other end thereof connected to an output shaft 13. The position of shaft 12 in relation to output shaft 13, that is the distance $r$, constitutes the first input and is introduced by a servomotor 14, driving a threaded shaft 15 carrying an axially movable carriage 16 which supports shaft 12. Shaft 15 is supported at its free end in a bearing bracket 31. The latter shaft is free to rotate about its axis in the carriage 16, as the latter moves axially along shaft 15 the distance $r$ in response to rotation of servomotor 14. The angle $\gamma$ through which shaft 12 is rotated constitutes a second input and this rotation is introduced into the device by a servomotor 17 by means of reduction gears 18 and 20. In this manner, two electrical signals representing input quantities are supplied to the elastica computer. Rotation of a pick-off device 21, such as a potentiometer, or transformer with rotating armature, as seen in FIG. 8, is mounted on output shaft 13 and provides an output signal proportional to the angle $\lambda$. This angle $\lambda$ is the angle between the axis of the shaft 15 and the tangent to the elastica 10 at the end which is connected to shaft 13. The input servomotors 14 and 17 receive the input quantities and rotate shaft 12 to supply those quantities to the particular problem being solved. However, the functions of the shafts 12 and 13 can be interchanged. As applied to navigation, this particular input is described in the aforementioned Galbraith Patent No. 2,983,441 as well as in the copending application of Michael Daniloff, Serial No. 87,615, filed February 6, 1961.

For certain values of the input to servomotors 14 and 17, the elastica, or elastic strip 10, as noted, may assume a shape resembling the letter S as shown in FIG. 1. When, in addition, the angle $\gamma$ becomes equal to the angle $\lambda$, this configuration becomes unstable and flops over into a configuration resembling the shape of a letter C, as shown by the dotted curve 22. As a result, the output shaft 13 suddenly rotates, so that the output angle $\lambda$ changes abruptly from the value $\lambda$ to approximately the value $-\lambda_1$ where $\lambda_1$ is numerically approximately equal to the angle $\lambda$. Thus, an undesirably unstable or double valued answer is obtained. In accordance with the invention, such flop-over is prevented by the application of damping strips 24 and 26 of materials previously referred to, such as nylon or plastic, in contact with the latter faces of the elongated flat elastic medium 25, as shown in FIGS. 1 and 2. Alternatively, the invention contemplates the use of two or more elastic strips clamped together in tight contact to provide frictional damping forces which prevent instability. Such frictional forces are produced by the relative translatory motion of strips 24 and 26 of FIG. 2, or elastic strips 27 and 36 of FIG. 3$a$; that is, the relative translatory motion of damping strips 24 and 26 along the lateral faces of the elastic strip 25 creates a damping bending couple. The shaft 13 is mounted in a cylindrical bearing 23 which has a lip 27 which is fastened to an elastic bearing support 29 to provide flexibility in the axial direction. The constructional details of such arrangement is shown in FIG. 7 and FIG. 8. The output shaft is the shaft 12[1], while shaft 93 is an input shaft. The elastic support 29 prevents damage to the elastica 10, or to gears 18 and 20 in the event that the shaft 15 becomes rotated so far that the distance $r$ approaches the length of the elastica 10.

FIG. 2 is an enlarged view which discloses the method of attaching the elastic strip 25 to the input shaft 12 by means of a bolt 28. Thus, rotation of shaft 12 determines the angular position adjacent to the end of the elastica 25. Damping strips 24 and 26 of FIGS. 1, 2, and 3 are secured tightly against the elastic strip 25 by means of C clamps 30, preferably made out of spring steel. FIG. 3 shows a sectional view of such a clamp applied to damping layers 24 and 26, and FIG. 3$a$ shows an alternative arrangement in which two or more elastic strips, such as strips 27 and 36 are held by a clamp 30, their ends being fastened to the input shaft 12 by bolt 28 extending through elongated slots 42 and 42$a$ in strips 27 and 36 to permit relative translatory motion of said strips. Alternatively, FIG. 4 shows an adjustable clamp 32 which can be substituted for clamp 30 and which is threaded through openings in the elastica strip 25 and damping strips 24 and 26. This clamp comprises a bolt 33, a wing nut 34, and a threaded elastic washer 35, thereby providing a symmetrical and adjustable means of securing together strips 24 and 26 against the opposite lateral faces of elastic strip 25. The force with which the damping strips are pressed together is made adjustable by tightening wing nut 34. In this manner, instability of the elastica is prevented for substantially all input values introduced by servo motor 14 and 17 in FIG. 1 and output shaft 13 rotates to provide an output signal proportional to the angle between the tangent to the elastica 10 at the shaft 13 and the axis of shaft 15.

Referring momentarily to FIGS. 7 and 8, the damped elastica 10 is shown mounted in a navigation instrument which may be placed on the instrument panel of a vehicle or craft. The output angle of shaft 12', as extracted by pick-up device 21 of FIG. 8, is interpreted as the required angle of motion of the craft, providing the proper inputs are supplied to servo motors 14 and 17 of FIG. 1, not visible in FIG. 8, and as explained in the above-referred-to Galbraith Patent No. 2,983,441, and the Daniloff co-pending application, Serial No. 87,615, filed February 6, 1961. The required angle of flight can be displayed in digital form by a counter mounted in window 36 of FIG. 7. In like manner, the inputs $\gamma$ and $r$ of FIG. 1 can be displayed in windows 37 and 38 of the instrument face 39 as shown in FIG. 7.

Referring now to FIGS. 5 and 8, there is shown a further embodiment of a damping device which can be used to further damp rotary motion of shaft 13 of FIG. 1 or shaft 12' of FIG. 7, or can be used as a separate damping device for providing a damping torque dependent upon the angular acceleration of the damped shaft.

In FIG. 5, there is shown a shaft 50, the rotation of which is to be damped in a manner dependent upon the angular acceleration of such shaft. A nonlinear damping device is the only known method of avoiding oscillation, or overshoots due to the inertia of the moving parts, and at the same time of minimizing the duration of the transient motion of the controlled part from one position to another. The particular nonlinear damping device shown in FIG. 5 is made responsive to the acceleration of components constituting said device, such as occur in analog computers. For example, the present device can be used also in the damping of the suspension of gyroscopes or in the controlling mechanisms of X, Y plotting devices. Since this device is responsive to the acceleration, that is, the second time derivative of the angle of rotation of shaft 50, a more sensitive and earlier damping action is achieved than when the damping is made dependent upon the velocity of motion or position, both of which quantities require a relatively lengthy time to reach significant values. For example, in FIG. 1 the angular acceleration during the flop-over process is maximum at the beginning of the motion when the velocity of rotation of the shaft 13 is zero. Likewise, at the termination of the flop-over process, that is, when the elastica 10 assumes the position 22 in FIG. 1, the acceleration reaches its maximum negative value, while the velocity of rotation again becomes zero. Thus, the acceleration damper of FIG. 5, when driven by shaft 13 of FIG. 1 or shaft 12′ of FIGS. 7 and 8, provides a damping action which is most effective at the beginning and end of the motion of the particular shaft to which it is connected, thus avoiding both overshoots of the angle of rotation as well as angular oscillations of said shaft. The damping of the elastica 10 of FIG. 1 by means of the strips 24 and 26, on the other hand, reaches a maximum when the speed of rotation of shaft 13 is itself at a maximum and the angular acceleration of the shaft is zero. Thus, when $\lambda$ is near zero, that is, when the angular velocity of shaft 13 is maximum and its angular acceleration is zero, the damping is achieved by strips 24 and 26, while at the beginning or the end of a flop-over motion, the damping device of FIG. 5 becomes most effective because the angular acceleration of shaft 50 reaches its greatest positive and negative value, respectively. Thus, effective damping of motion during the entire process of flop-over is achieved by damping not only the first time derivative of the variable, as shown by the device of FIG. 1, but also, where desired, of the second time derivative of the same variable, as shown by the devices of FIGS. 5 and 8.

It should be understood that the damping device shown in FIG. 5 can be used independently in any application where it is desired to provide a damping action dependent upon the acceleration of the motion to be damped.

Referring again to FIG. 5, a damping disc 52 is shown connected to the shaft 50 to be damped. This disc can be integral with the aforementioned shaft and is made preferably of aluminum to minimize its moment of inertia. The damping disc 52 is immersed in a damping liquid, such as water, oil, silicone liquids or other viscous fluids, depending upon the amount of damping required. For example, for damping the acceleration of the output shaft 13 of FIG. 1, a number 10–30 SAE oil is adequate. The damping fluid is contained preferably in a brass, copper, or aluminum container or capsule 53, which encloses disc 52 with a small clearance of approximately .010 to .030 inch, as determined by the value of the damping torque required. As an example, the maximum damping torque required for the elastica 10 shown in FIG. 7 is approximately .25 to .50-inch pound. A damping torque of this order is sufficient for damping the elastica shown full size in FIG. 7, wherein the width of the elastica strip 25 is approximately ¼ to $\frac{3}{16}$ inch, and its thickness is approximately .015 to .030 inch of a steel strip material, approximately 2.75 inches in length.

Referring to FIGS. 5 and 8, capsule 53 is supported on a bracket 54, which is part of the carriage 56. The input shaft 93 is supported on flexible bearing support 29 which is bolted to supporting frame 57, which, in turn, is supported by a cast frame 41 which fits securely into the casing or mounting frame 40 of FIG. 8. Carriage 56 is threaded for reception of shaft 15 and driven by servo motor 14 of FIG. 1, not visible in FIG. 8.

Figure 6A:
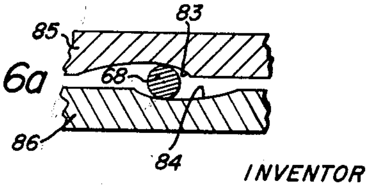

A flywheel or other inertial element 58 is mounted to rotate freely on the shaft 50. Its hub 59 of FIG. 5, an enlarged side elevation of which is shown in FIG. 6 and FIG. 6*a*, carries a plurality of radial V-shaped grooves 62. Similar grooves 64 are provided in the upper rim 65 of a sleeve 66. Between said V-shaped pyramidal grooves are inserted conical rollers 67 and 68, preferably of hardened steel. The number of conical rollers can be increased above the two shown in FIG. 5. The sleeve 66 is free to slide lengthwise on shaft 50 and is made to rotate with the shaft 50 by means of a positioning key 70 which is fitted into the shaft 50, on the one hand, and projects into an axial groove 72 milled in the sleeve 66, as shown in FIGS. 5 and 9. In this manner, any rotation of shaft 50 is imparted to the sleeve 66. However, the latter is free to slide longitudinally along the axis of shaft 50. A helical spring 74 of FIG. 5 rests against the bracket 76 of FIG. 5 at one end, and is pressed against a bearing ring 78 of FIG. 5. A roller bearing 87 is inserted between the ring 78 and the lip 65 of sleeve 66.

In operation, whenever shaft 50, which is connected to the part the motion of which is to be stabilized, rotates, it transmits its rotation to the damping disc 52 and to the sleeve 66 through the means of a key 70 which fits into axial groove 72 of sleeve 66, as shown in FIGS. 5 and 9. However, since the helical spring 74 presses by means of bearing rings 78 against rollers 67 and 68 of hub 59 of flywheel 58, the latter will transmit its motion through the rollers 67 and 68 of FIGS. 5 and 6 to the flywheel 58, which then rotates substantially in synchronism with shaft 50. This rotation takes place when the angular acceleration of shaft 50 is zero, that is, when shaft 50 rotates at uniform speed. However, when the speed of rotation of shaft 50 is either increasing or decreasing, the flywheel 58 will exert a tangential inertial reaction against the rollers 67 and 68. As a result, these rollers tend to climb up the sides of the V-grooves 62 and 64, irrespective of whether the rotation of shaft 50 is accelerating or decelerating. However, the magnitude of the tangential inertial reaction applied to rollers 67 and 68 is proportional to the magnitude of the angular acceleration of shaft 50, regardless of whether this acceleration is positive or negative, that is, whether the flywheel 58 tends to lag or lead the rotation of shaft 50, the former occurring when the rotation of shaft 50 is accelerating and the latter occurring when the rotation of shaft 50 is decelerating. It should be understood the number of conical rollers 67 and 68, as noted, could be increased to three or more rollers, if desired to decrease the load on each roller.

Any relative rotational motion between the hub 59 and the lip 65 causes a separation between them in the axial direction of shaft 50. However, since the hub 59 is restrained from moving in an axial direction away from container 53 by a washer 79 and a pin 82, the sleeve 66 is urged against spring 74 away from hub 59, thus pressing against the upper face 80 of container 53. This decreases the axial clearance between the face 80 and the damping disc 52 which, in turn, increases the tangential shearing force against the upper face of disc 52 caused by rotation and increases the damping torque exerted thereon. Circumferential corrugations 81 increase the flexibility of face 80 in the axial direction and in addition act as a reservoir for the damping fluid displaced by the movement of the face 80.

Alternatively, a circular damping plate, not shown, can be connected to sleeve 66 and positioned to move axially with the latter within the fluid, thus decreasing the axial clearance and increasing the damping torque. In this case, the circumferential grooves 81 are not required, since the fluid displaced from between the damping plate and the disc 52 can move around the edge of the said plate into the space made available by the axial movement of the plate in response to the movement of sleeve 66.

Referring to FIG. 6, when the faces of the grooves 64 and 62 are planes, the axial motion of sleeve 66 is proportional to the angular acceleration of shaft 50 and thus the damping torque exerted on disc 52 varies substantially linearly with the angular acceleration of the shaft 50 for small movements of sleeve 66 relative to the clearance between the damping disc 52 and the face 80 of capsule 53. However, if grooves 83 in hub 85 and groove 84 in lip 86 of sleeve 66 of FIG. 6a are shaped as conical surfaces, the axial motion of sleeve 66 can be made any desired function of the acceleration of shaft 50. Thus, when the required damping is a nonlinear function of the angular acceleration, the plane faces of the grooves of FIG. 6 are replaced by the conical surfaces 83 and 84 of FIG. 6a. These conically shaped surfaces which produce a preset nonlinear variation of the damping in response to angular acceleration of the damped element are shown in FIG. 6a and have approximately the following dimensions: They are approximately .05 to .07 inch in circumferential length and approximately .1 to .2 inch in radial length and .01 to .02 inch in depth for use with conical rollers 67 and 68 which have a maximum diameter of .02 to .04 inch. A Gleason-type conical gear shaper or similar well-known machine tool apparatus is suitable for manufacturing grooves 83 and 84 according to well-known techniques.

The precise shape of the groove surfaces may be determined by the following design procedure:

A Cartesian rectangular coordinate system is used with the origin at the bottom of the groove 86. The axis of abscissas $x$ is the circumference lying in a plane normal to the axis of shaft 50 of the lip 65, while the ordinate $y$ is the actual height of the ramp of the groove 86.

Since the roller 68 must be in equilibrium on the ramp under the combined action of the inertial reaction T and the force F of the spring 74, and neglecting the forces of friction which are small in the case of rolling surfaces:

$$y'=\frac{dy}{dx}=\frac{T}{F} \quad (1)$$

Calling $F_0$ the initial tension of the spring and K the spring constant:

$$F=F_0+Ky \quad (2)$$

On the other hand:

$$T=\frac{I\ddot{\theta}n}{r_0} \quad (3)$$

in which $\ddot{\theta}$ is the angular acceleration of the shaft 50, I the inertia of all moving parts reflected upon said shaft, $r_0$ the outside radius of the lip 65 and $n$, a parameter ($\frac{1}{4}\leqq n\leqq\frac{1}{2}$) describing the distribution of bearing pressures along the generator of the conical roller 68. The upper value of $n$ applies to hard materials and rigid configurations.

Since the relative rotation of hub 59 and lip 65 must be proportional to the inertial reaction, the following relation must hold:

$$\frac{I\ddot{\theta}n}{r_0}=\frac{ax}{r_0} \quad (4)$$

where $a$ is a coefficient of proportionality found from the condition:

$$\text{at } \ddot{\theta}=\ddot{\theta}_{max},\ x=\phi_m r_0 \quad (5)$$

in which $\ddot{\theta}_{max}$ is the maximum angular expected acceleration of the shaft 50 and $\phi_m$ the maximum permissible angle of relative rotation between the hub 59 and the lip 65. In general, this would be the apex angle of the groove 84. From Equations 4 and 5:

$$I\ddot{\theta}_m n=a\phi_m r_0 \quad (6)$$

and so:

$$a=\frac{I\ddot{\theta}_m n}{\phi_m r_0} \quad (7)$$

The damping torque $T_D$ is a function of the displacement $y$:

$$T_D=F(y)=F_1(\ddot{\theta}) \quad (8)$$

and this is set equal to the desired function $F_1(\ddot{\theta})$ of the acceleration $\ddot{\theta}$.

The function $F_1(y)$ is found as follows:

On an elemental ring of width $dr$ the damping torque is:

$$2\pi rsdr.r=2\pi r^2 sdr \quad (9)$$

in which the shear stress $s$ developed in the damping liquid is given by:

$$\mu.\frac{2\pi r\dot{\theta}}{h}=2\pi\frac{\mu}{h}r\dot{\theta} \quad (10)$$

The angular velocity of shaft 50 being $\dot{\theta}$, the viscosity of the damping fluid $\mu$ and the separation of the moving surfaces of the damper being $h$, integration of Equation 9 yields:

$$(2\pi)^2\frac{\mu}{h_1}\dot{\theta}\int_{r_1}^{r_2}r^3dr=\pi^2\frac{\mu}{h_1}\dot{\theta}(r_2^4-r_1^4) \quad (11)$$

In this equation, $h_1$ is the separation between the face of the damping disc 52 and the stationary face of the damping capsule 53, $r_1$, is the radius of the shaft 50 and $r_2$ is the outside radius of the damping disc 52.

In like manner, the damping torque exerted on the cylindrical face of disc 52 is as follows:

$$\frac{2\pi r_2\dot{\theta}}{h_2}\cdot\mu\cdot 2\pi r_2 t r_2=\frac{4\pi^2 r_2^3\mu\dot{\theta}t}{h_2} \quad (12)$$

in which $h_2$ is the radical clearance between the cylindrical face of the disc 52, and the wall of the damper's capsule 53 and $t$, the thickness of the above disc.

The face of the capsule 53 is deflected towards the face of damping disc 52 by the axial motion of the sleeve 66. This deflection is a complicated function of the radial distance, but for small deflections, as is the case here, it can be replaced by a parabolic approximation, to wit:

$$\eta(r)=y\cdot\frac{r_2^2-r^2}{r_2^2-r_1^2} \quad (13)$$

in which $\eta(r)$ is the value of the axial deflection at the distance $r$. The axial clearance becomes:

$$h=h_3-\eta(r) \quad (14)$$

where $h_3$ is the axial clearance of the undeflected face from the disc 52. The elementary damping torque is then:

$$4\pi^2\mu\dot{\theta}\frac{r^3dr}{h}=4\pi^2\mu\dot{\theta}\frac{r^3}{h_3-\eta(r)}dr \quad (15)$$

and so the integrated torque is:

$$4\pi^2\mu\dot{\theta}\int_{r_1}^{r_2}\frac{r^3}{h^3-y\frac{r_2^2-r^2}{r_2^2-r_1^2}}dr=4\pi^2\mu\dot{\theta}F(y) \quad (16)$$

in which the integral is designated by the (known) function F(y). Thus, the total damping torque is:

$$T_D=\pi^2\mu\dot{\theta}\left[\frac{r_2^4-r_1^4}{h_1}+4\frac{r_2^3t}{h_2}+4F(y)\right]=F_1(\ddot{\theta}) \quad (17)$$

where $F_1(\ddot{\theta})$ is the required dependence of the damping torque upon the angular acceleration of the shaft 50 to be damped, as defined previously (see Equation 8). Solving for $y$ in terms of $T_D$:

$$y=F^{-1}\{F_1(\ddot{\theta})\} \quad (18)$$

in which $F^{-1}$ represents the solution of Equation 17 for y. (This may be obtained numerically as a table or a curve.) But from Equation 4:

$$\ddot{\theta}=\frac{ax}{In} \quad (19)$$

and using Equation 7 for $a$:

$$\ddot{\theta}=\frac{n\theta m_x}{\phi_m r_0} \quad (20)$$

From Equation 1 above:

$$y^1=\lambda=\frac{dy}{dx}=\frac{ax}{r_0}\Big|\ \left[F_0\left(KF^{-1}\left\{F_1\left(\frac{ax}{In}\right)\right\}\right]\right. \quad (21)$$

where λ is the slope of the ramp, and integrating:

$$y=\frac{nI\ddot{\theta}_m}{\phi_m r_0^2}\cdot\int_0^{\phi_m r_0}\frac{x}{F_0+KF^{-1}\left\{F_1\left(\frac{n\ddot{\theta}_m}{\phi_m r_0}x\right)\right\}}dx \quad (22)$$

Let $y_1$ be the rise of one rise or ramp and $y_2$ that of the opposite, then taking into account the shifting, due to the slopes of the ramp, of the points of contact between the ramps of grooves 83 and 84 and the conical roller 68:

$$y=y_2(x_1)+y(_1x_1)+\frac{R}{2}[\lambda^2(x_2)-\lambda^2(x_1)] \quad (23)$$

where R is the largest radius of the conical roller 68 and $x_1$ and $x_2$ are the abscissa of the points of contacts with ramps 83 and 84. These are found from the equations:

$$\left.\begin{aligned}x_2-R\lambda(x_2)=x\\x_1-R\lambda(x_1)=x\end{aligned}\right\} \quad (24)$$

in which $x$ is the abscissa of the center line of roller 68 and which equations are best solved numerically.

For ease of manufacturing the absolute values $|y_1|$ and $|y_2|$ are, most appropriately, made equal:

$$|y_1|=|y_2|=\bar{y} \quad (25)$$

and so the required rise of the ramp 84 is given by the exact expression:

$$\bar{y}=1/2\left\{y-\frac{R}{2}\left[\lambda^2(x_2)-\lambda^2(x_1)\right]\right\} \quad (26)$$

If utmost accuracy is not required, the (small) correction term in R can be neglected and thus:

$$\bar{y}\cong 1/2y \quad (27)$$

Referring now to FIG. 8, there is shown a side elevation of a navigational guidance instrument utilizing the damped elastica 10, the front elevation being shown in FIG. 7, as previously described. In FIGS. 7 and 8, shaft 93 is an input shaft, the other input being supplied by screw 15, threaded through the movable carriage 56 which carries the electrical pickup device 21 rotated by output shaft 95. This shaft drives the pickup device 21 by means of a flange 97 engaging a flange 98 mounted on the shaft of the pickup 21 by means of a driving pin 99. Input shaft 93 is supported elastically in the axial direction of shaft 15 by means of the elastic support 29 fastened to lug 27*a* of the bearing of shaft 93, as shown in FIGS. 7 and 8. Support 29 is connected to the cartridge or supporting cylinder 57 which, in turn, is supported by the casing or frame 41 of the device. The function of the elastic bearing support 29 has been explained in connection with FIG. 1, in which, however, support 29 was shown connected to the bearing 23 of output shaft 13. The shaft 50 to be damped is driven from the flange 97 by means of a geared wheel 100 which meshes with gears cut on the circumference of flange 97. This flange transmits the rotation of the output shaft 95 to the shaft 50 of the damping disc which is immersed in the damping fluid contained in capsule 53. Capsule 53 rests on the bracket 54 of the carriage 56. Shaft 95 is supported in bearings 101 and 102 which, in turn, are inserted in tube 23*a* of carriage 56. Output pickup 21 is fastened to carriage 56 by means of clamps 103. It comprises a well-known transformer for alternating current having a stationary primary winding and a rotatable secondary winding to provide a signal proportional to the angle of rotation of the secondary winding in relation to the primary. Alternatively, the pick up 21 may consist of a well-known potentiometer for use with alternating or direct current. Thus, the output taken from pickup 21 of FIG. 8 represents the output of the computer stabilized by the nonlinear acceleration damper shown in FIG. 5, as well as by the damped elastica 10 of FIGS. 1 or 7. Thus, for input values to the conventional computer input servos, not visible in FIG. 8, and corresponding to input servos 14 and 17 of FIG. 1, the elastica computing element 10 provides the solution of the particular problem, which in the instrument of FIGS. 7 and 8 is the required angle of flight of a vehicle, as explained in detail in the above-referred to Galbraith patent and Daniloff application. In this manner, the output of pickup 21 is free from spurious electrical signals due to "flip-over" oscillations and overshoots of the computing element 10.

The system thus possesses the desirable characteristics of a nonlinear control system which minimizes transients without introducing overshoots and oscillations, as is described in the following presentation of physical principles used in the present invention:

A servo-system when expressed in mechanical terms is, in general governed by an equation of the form:

$$m\ddot{x}+c\dot{x}+KX=F_0 \quad (28)$$

in which $m$ is the mass of the moving elements, $\ddot{x}$ the acceleration of the section, $c$ the damping coefficient, $\dot{x}$ the velocity of motion, K the spring constant of the system, $x$ the displacement, and $F_0$ the impressed force. The latter is for purposes of analysis, taken as a unit step or a sinusoidal function. In a linear system, the damping coefficient $c$ is constant. If, in such a system, attempts are made to minimize the duration of the transient period, overshoots and oscillations cannot be avoided.

In the present invention, however, the damping coefficient $c$ is made dependent upon the displacement, as in the embodiment shown in FIG. 1, or upon the acceleration of the motion, as shown in the embodiment in FIG. 5 or upon the joint action of these two variables as in the embodiment shown in FIGS. 7 and 8. Thus, the invention covers a nonlinear system, specifically, one in which the coefficient $c$ of Equation 28 above takes on the form:

$$c=a_0f_1(x)+a_2f_2(\ddot{x})$$

where $f_1(x)$ is a known, $f_2(\ddot{x})$ a preset function, and $a_0$, $a_2$ appropriate constant coefficients. With a nonlinear system, the duration of the transient period can be reduced drastically and this without producing either overshoots above the value required or oscillations of the motion. In other words, the present invention stabilizes a system capable of oscillations and one, which under certain conditions of operation becomes unstable in the absence of the stabilizing means herein described.

This invention is not limited to the particular details of construction, materials, and processes described, as many equivalents will suggest themselves to those skilled in the art. Accordingly, it is desired that this invention be not limited to the particular embodiments disclosed herein except as defined by the appended claims.

What is claimed is:

1. In combination, a deformable element of a length representing a preset length of path between two preselected points, means to apply a rotation to one end of the element in response to a first input signal, means for varying the distance between the extremities of said element in response to a second input signal proportional to the distance between said preselected points, means for extracting an output signal in response to the rotation of the other extremity of said element, and means for applying a frictional damping force to said element acting along the surface of said element.

2. In combination, a deformable element of a length representing a preset length of path between two preselected points and having two ends, means to apply a rotation to one end of the element in response to a first input signal, means for varying the distance between said ends of said element in response to a second input signal representing the distance between said preselected points, and means for extracting an output signal in response to the rotation of the other end of said element, and means for applying a frictional damping force acting along the surface of said element.

3. In combination, a flexible element having a fixed length, said ends of said element being mounted for rotation, means to apply a rotation to one end of the element in response to a first input signal, and means for varying the distance between said ends of said element in response to a second input signal increasing with the distance between two preselected points and decreasing with the preset length of path between the aforementioned two fixed points, said opposite ends of said medium representing said preselected points, and said element being constrained in accordance with said input signals to produce a representation of the preset path between said points, and means for applying a frictional damping force acting along said flexible element.

4. In combination, a flexible element having a fixed length and a plurality of constituent members arranged to produce a frictional damping force in response to the relative translatory motion of said constituent members to prevent instability of said flexible element, said ends of said element being mounted for rotation, means to apply a rotation to one end of the element in response to a first input signal, means for varying the distance between said ends of said element in response to a second input signal proportional to the distance between two preselected points, said opposite ends of said medium representing said preselected points, and said element being constrained in accordance with said input signals to produce a representation of the preset path between said points.

5. In combination, a deformable element having a fixed length, means for applying a rotation to one end of the element in response to a first input signal, means for varying the distance between said ends of said element in response to a second input signal proportional to the distance between two preselected points, means including a plurality of elastic elements arranged to produce a frictional damping force to prevent instability of said deformable element, and means for extracting an output signal in response to the rotation of the other end of said element.

6. In combination, a flexible element, means for bending said element in response to an input signal, said flexible element including frictional means for producing an element deformation damping force acting along the surface of said element determined by the magnitude of said deformation and being a maximum when the angular acceleration of said element is at a minimum, and means for applying a damping force in response to and which varies as the angular acceleration of the relative motion of said element being a maximum at the beginning and end of said element motion.

7. In combination, a deformable element of a length representing a preset length of path between two preselected points, means to apply a rotation to one end of the element in response to a first input signal, means for varying the distance between the extremities of said element in response to a second input signal proportional to the distance between said preselected points, means for extracting an output signal in response to the rotation of the other extremity of said element, means for applying a damping force to said element, and means for damping said deformable element including a plurality of damping elements held in frictional contact with a surface of said deformable element.

8. In combination, a deformable element of a length representing a preset length of path between two preselected points, means to apply a rotation to one end of the element in response to a first input signal, means for varying the distance between the extremities of said element in response to a second input signal proportional to the distance between said preselected points, means for extracting an output signal in response to the rotation of the other extremity of said element, means for applying a damping force to said element, and means for damping said deformable element including a plurality of damping elements held in frictional contact with a surface of said deformable element, the other end of said deformable element being mounted on an elastic supporting means to permit relative motion of said supporting means in relation to said one end of said deformable element.

9. In combination, a flexible element comprising a plurality of elastic strips held in frictional contact with each other to provide a damping force, means to apply a rotation to one end of the said element in response to a first input signal, means for varying the distance between said ends of said element in response to a second input signal proportional to the distance between preselected points, and means for extracting an output signal in response to the rotation of the other end of said element.

10. A device for damping rotation of a shaft including movable and stationary surfaces containing a damping fluid, a damping disc immersed in said fluid, means for varying the distance between said movable and stationary surfaces determined by the angular acceleration of the motion of the movable surfaces in respect to the stationary surfaces for producing a damping force upon said disc which varies as said acceleration, being a maximum at the beginning and end of said motion.

References Cited by the Examiner

UNITED STATES PATENTS

| | | | |
|---|---|---|---|
| 1,283,556 | 11/18 | Pool | 177—184 |
| 1,709,471 | 4/29 | Hallwood | 177—188 |
| 2,243,217 | 5/41 | Lorini | 267—1 |
| 2,598,812 | 6/52 | Marco | 177—211 |
| 2,660,422 | 11/53 | Parker | 73—522 |
| 2,983,441 | 5/61 | Galbraith | 235—61 |

LEO SMILOW, *Primary Examiner.*

A. BERLIN, *Examiner.*

UNITED STATES PATENT OFFICE

CERTIFICATE OF CORRECTION

Patent No. 3,195,811 July 20, 1965

Michael Daniloff

It is hereby certified that error appears in the above numbered patent requiring correction and that the said Letters Patent should read as corrected below.

Column 3, line 66, for "latter" read -- lateral --; column 8, line 29, for "radical" read -- radial --; lines 50 to 54, for that portion of equation (16) reading "$h^3$" read -- $h_3$ --; column 9, lines 6 to 9, for that portion of equation (22) reading $\int_0^{\phi m^{r}0}$ read $\int_0^{\phi_m r_0}$ column 10, line 11, for '"flip-over"' read -- \"flop-over" --.

Signed and sealed this 22nd day of February 1966.

(SEAL)
Attest:

ERNEST W. SWIDER
Attesting Officer

EDWARD J. BRENNER
Commissioner of Patents